United States Patent
Ishiko et al.

(10) Patent No.: US 6,329,103 B1
(45) Date of Patent: Dec. 11, 2001

(54) SOLID ELECTROLYTE AND METHOD FOR PRODUCING IT

(75) Inventors: Eriko Ishiko, Hyogo; Michiyuki Kono, Osaka, both of (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/353,995

(22) Filed: Jul. 15, 1999

(30) Foreign Application Priority Data

Sep. 22, 1998 (JP) .................................................. 10-267999

(51) Int. Cl.$^7$ ....................................................... H01M 6/18
(52) U.S. Cl. ............................................. 429/312; 429/189
(58) Field of Search ..................................... 429/312, 189, 429/306; 29/623.1; 252/62.2, 62.3 Q

(56) References Cited

U.S. PATENT DOCUMENTS 5,356,553 * 10/1994 Kono et al. .
5,358,620 * 10/1994 Golovin et al. .
5,436,090 * 7/1995 Kono et al. .
5,498,491 * 3/1996 Golovin .
5,571,392 * 11/1996 Sato et al. .
5,952,126 * 9/1999 Lee et al. .

FOREIGN PATENT DOCUMENTS 5-36305    2/1993  (JP) .
5-114419   5/1993  (JP) .
5-151992   6/1993  (JP) .

OTHER PUBLICATIONS

Rosen, Stephen. 1993. Fundamental Principles of Polymeric materials. pp. 144–145.*

* cited by examiner

Primary Examiner—Tom Dunn
Assistant Examiner—Jonathan Johnson
(74) Attorney, Agent, or Firm—Jordan and Hamburg LLP

(57) ABSTRACT

A solid electrolyte is disclosed, which comprises a crosslinked product of an alkylene oxide polymer having a polymerizable double bond at the terminal and/or in the side chain, and an electrolytic salt. In this, the alkylene oxide polymer is thermally crosslinked in the presence of an organic peroxide initiator having an activation energy of at most 35 Kcal/mol and having a half-value period of 10 hours at a temperature not higher than 50° C.

4 Claims, No Drawings

SOLID ELECTROLYTE AND METHOD FOR PRODUCING IT

BACKGROUND OF THE INVENTION

The present invention relates to a solid electrolyte usable in batteries, capacitors, electrochromic devices, sensors, etc.

Solid electrolytes are produced, for example, by mixing an acryloyl-modified polymer compound having an alkylene oxide polymer chain, an electrolytic salt and, optionally, a solvent, in which mixture the polymer compound is crosslinked.

For crosslinking the polymer compound, employable are any among the following: UV irradiation, electronic irradiation, thermal crosslinking and the like, which, however, have the following drawbacks.

In a cell system containing a solid electrolyte, the solid electrolyte acting as a binder shall be also in the positive electrode and the negative electrode, wherein active materials are employed. For the solid electrolyte in such a cell system, UV irradiation is often problematic in that UV rays cannot readily penetrate into the cell system because of the existence of active materials. As a result, the polymer compound constituting the solid electrolyte is often difficult to crosslink through such UV irradiation to a satisfactory degree.

Polymer crosslinking through electronic irradiation may be possible even in such a cell system, as the transmittance of electron rays through the system is high. However, satisfactory polymer crosslinking is difficult in thick cell systems even through electronic irradiation. In addition, another problem with electronic irradiation is that the apparatus for it is expensive.

Conventional thermal crosslinking requires heating at high temperatures of 90° C. or higher, and is therefore problematic in that it often causes degradation of electrolytic salts and much vaporization of solvents, if used.

In that situation, some improved methods for producing solid electrolytes have been proposed in JP-A 5-36305, 5-114419 and 5-151992, which, however, are still defective in the following points. In the method in JP-A 5-36305, a radical polymerization accelerator or retardant is used so as to control the curing rate of polymers, and the amount thereof to be added to the polymer system must be controlled extremely accurately. The method in JP-A 5-114419 and 5-151992 is characterized in that two solutions, either one of which contains an alkali metal salt, are mixed and cured in cells, and therefore the application range of the method is limited.

The invention has been made in consideration of the problems noted above. Namely, the object of the invention is to provide a solid electrolyte obtained by employing a specific crosslinking initiator in order to solve the above-identified problems.

SUMMARY OF THE INVENTION

The solid electrolyte of the invention comprises a crosslinked product of an alkylene oxide polymer having a polymerizable double bond at the terminal and/or in the side chain, and an electrolytic salt, in which the alkylene oxide polymer is thermally crosslinked in the presence of an organic peroxide initiator having an activation energy of at most 35 Kcal/mol and having a half-value period of 10 hours at a temperature not higher than 50° C.

Preferably, the alkylene oxide polymer is represented by the following chemical formula (1) or (2):

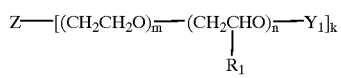   (1)

wherein Z represents a residue of an active hydrogen compound;
k represents an integer of from 1 to 6;
$R_1$ represents an alkyl group or —$CH_2$—O—$Re_1$—$Re_2$;
$Re_1$ represents —$(CH_2CH_2O)_{p1}$—, p1 represents 0 or any integer;
$Re_2$ represents an alkyl group;
$Y_1$ represents an acryloyl group or a methacryloyl group;
m represents an integer of from 0 to 460, and n represents an integer of from 0 to 350.

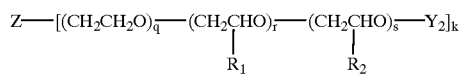   (2)

wherein Z represents a residue of an active hydrogen compound;
k represents an integer of from 1 to 6;
$R_1$ represents an alkyl group or —$CH_2$—O—$Re_1$—$Re_2$;
$R_2$ represents —$CH_2$—O—$Re_1$—$Re_3$;
$Re_1$ represents —$(CH_2CH_2O)_{p1}$—, p1 represents 0 or an integer of 1 or more;
$Re_2$ represents an alkyl group;
$Re_3$ represents an alkenyl group;
$Y_2$ represents an alkyl group, an aralkyl group, an aryl group, an acryloyl group or a methacryloyl group;
q represents an integer of from 0 to 100,000, r represents an integer of from 0 to 50,000, and s represents an integer of from 1 to 22,000.

The solid electrolyte may optionally contain a low-molecular weight polar solvent.

One method for producing the solid electrolyte comprises preparing a precursor that contains an alkylene oxide polymer having a polymerizable double bond at the terminal and/or in the side chain, an electrolytic salt, and, optionally, a solvent, followed by thermally crosslinking the alkylene oxide polymer in the resulting precursor; which is characterized in that an organic peroxide initiator having an activation energy of at most 35 Kcal/mol and having a half-value period of 10 hours at a temperature not higher than 50° C. is added to the precursor being prepared, in an amount of from 0.05 to 5% by weight relative to the total weight of the alkylene oxide polymer, the electrolytic salt and the solvent, and that the alkylene oxide polymer in the resulting precursor is thermally crosslinked.

The polymer in the solid electrolyte of the invention is crosslinked in the presence of an organic peroxide initiator having specific physical properties, and its crosslinking can be attained at low temperatures not higher than 50° C., for example, even at room temperature. Crosslinking the polymer in the solid electrolyte of the invention does not require any expensive apparatus such as those for electron irradiation, and is free from the problem with conventional thermal crosslinking that causes degradation of electrolytic salts and vaporization of solvents.

Therefore, the solid electrolyte of the invention is extremely useful, as being able to be in any systems containing active materials, such as cells, etc.

DETAILED DESCRIPTION OF THE INVENTION

To produce the solid electrolyte of the invention, a precursor that comprises, as the indispensable components, an alkylene oxide polymer having a polymerizable double bond, for example, an acryloyl group, a methacryloyl group or the like, at the terminal and/or in the side chain, and an electrolytic salt, and optionally contains a low-molecular weight polar solvent (plasticizer), is prepared, and the alkylene oxide polymer in the precursor is thermally crosslinked in the presence of a specific organic peroxide initiator.

The components are mentioned in detail hereinunder.

1. Alkylene Oxide Polymer

The alkylene oxide polymer for use in the invention, which has a polymerizable double bond at the terminal and/or in the side chain is not specifically defined. Preferred is any one or a mixture of two having a structure of the following chemical formula (1) or (2). One or more of those alkylene oxide polymers may be employed herein either singly or as combined.

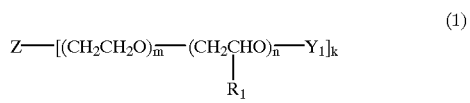
(1)

wherein Z represents a residue of an active hydrogen compound;

k represents an integer of from 1 to 6;

$R_1$ represents an alkyl group or —$CH_2$—O—$Re_1$—$Re_2$;

$Re_1$ represents —$(CH_2CH_2O)_{p1}$—, p1 represents 0 or an integer of 1 or more;

$Re_2$ represents an alkyl group;

$Y_1$ represents an acryloyl group or a methacryloyl group;

m represents an integer of from 0 to 460, and n represents an integer of from 0 to 350.

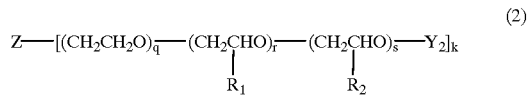
(2)

wherein Z represents a residue of an active hydrogen compound;

k represents an integer of from 1 to 6;

$R_1$ represents an alkyl group or —$CH_2$—O—$Re_1$—$Re_2$;

$R_2$ represents —$CH_2$—O—$Re_1$—$Re_3$;

$Re_1$ represents —$(CH_2CH_2O)_{p1}$—, p1 represents 0 or an integer of 1 or more;

$Re_2$ represents an alkyl group;

$Re_3$ represents an alkenyl group;

$Y_2$ represents an alkyl group, an aralkyl group, an aryl group, an acryloyl group or a methacryloyl group;

q represents an integer of from 0 to 100,000, r represents an integer of from 0 to 50,000, and s represents an integer of from 1 to 22,000.

The alkylene oxide polymer may be prepared from a starting material of an active hydrogen compound, such as diglycerin, pentaerythritol or the like, for example, by adding a monomer of, for example, ethylene oxide, propylene oxide or the like to the starting compound, followed by esterifying the resulting adduct with an unsaturated organic acid, for example, acrylic acid, methacrylic acid or the like, or by reacting the adduct with an acid chloride, for example, acrylic acid chloride, methacrylic acid chloride or the like through dehydrochlorination.

2. Organic Peroxide Initiator

The organic peroxide initiator for use in the invention shall satisfy the condition that it has an activation energy of at most 35 Kcal/mol and has a half-value period of 10 hours at a temperature not higher than 50° C. (the temperature at which the concentration of the organic peroxide is reduced to a half of its original concentration in 10 hours is not higher than 50° C.).

Specific examples of the organic peroxide initiator include isobutyryl peroxide, α,α'-bis(neodecanoylperoxy) diisopropylbenzene, cumylperoxy neodecanoate, di-n-propylperoxy dicarbonate, diisopropylperoxy dicarbonate, 1,1,3,3-tetramethylbutylperoxy noedecanoate, bis(4-t-butylcyclohexyl)peroxy dicarbonate, 1-cyclohexyl-1-methylethylperoxy neodecanoate, di-2-ethoxyehtylperoxy dicarbonate, di(2-ethylhexylperoxy) dicarbonate, t-hexylperoxy neodecanoate, dimethoxybutylperoxy dicarbonate, di(3-methyl-3-methoxybutylperoxy) dicarbonate, t-butylperoxy neodecanoate, etc.

The organic peroxide initiator may be added to form the precursor of the solid electrolyte, in an amount of from 0.05 to 5% by weight, more preferably from 0.1 to 3% by weight, relative to the total weight of an alkylene oxide polymer, an electrolytic salt and a solvent.

3. Electrolytic Salt

Any and every electrolytic salt that has heretofore been used in solid electrolytes is employable herein. The type of the electrolytic salt for use herein is not specifically defined. Preferred are one or more selected from lithium fluoride, lithium chloride, lithium bromide, lithium iodide, lithium nitrate, lithium thiocyanate, lithium perchlorate, lithium trifluoromethanesulfonate, lithium tetraborofluoride, bistrifluoromethylsulfonylimido lithium, tristrifluoromethylsulfonylmethido lithium, sodium thiocyanate, sodium perchlorate, sodium trifluoromethanesulfonate, sodium tetraborofluoride, potassium thiocyanate, potassium perchlorate, potassium trifluoromethanesulfonate, potassium tetraborofluoride, magnesium thiocyanate, magnesium perchlorate, and magnesium trifluoromethanesulfonate.

4. Solvent

A low-molecular weight polar solvent (plasticizer) is optionally used in the invention.

The type of the solvent for use herein is not specifically defined. Preferred are one or more selected from cyclic esters, cyclic carbonates, cyclic ethers, nitriles, linear carboxylates, linear carbonates, sulfolane, sulfolane derivatives, dimethylsulfoxide, N,N-dimethylformamide, and N-methyloxazolidinone.

The amount of the solvent may fall between 0 and 1,900% by weight relative to the mixture of an alkylene oxide polymer and an electrolytic salt.

The invention is described in more detail with reference to the following Examples, which, however, are not intended to restrict the scope of the invention.

Production Example

Production of Alkylene Oxide Polymers

Polymers No. A-1 to No. A-11 were prepared by adding a monomer component to an active hydrogen compound. These polymers are compounds of formula (1) or (2) noted above, in which Z, the monomer units constituting alkylene oxide moieties, the monomer unit configuration and the terminal group are as indicated in Table 1. The molecular weight of each polymer is also in Table 1.

TABLE 1

| Polymer No. | Z | Monomer Component | | | Configuration | Terminal Group (Y1) | Terminal Group (Y2) | Molecular Weight |
|---|---|---|---|---|---|---|---|---|
| A-1 | EGMME | EO;31 | — | — | H | A | — | 1400 |
| A-2 | EG | EO;10 | — | — | H | A | — | 600 |
| A-3 | G | EO;54 | PO;10 | — | R | A | — | 3200 |
| A-4 | TMP | EO;90 | BO;14 | — | R | A | — | 5200 |
| A-5 | DG | EO;110 | PO;70 | — | R | M | — | 9300 |
| A-6 | PE | EO;10 | ME2;40 | — | B | A | — | 7800 |
| A-7 | SO | EO;300 | ME1;45 | — | B | A | — | 19000 |
| A-8 | EG | EO;100 | BO;20 | AGE;10 | B | — | methyl | 7000 |
| A-9 | G | EO;200 | PO;100 | AGE;10 | B | — | benzyl | 16000 |
| A-10 | EG | EO;85200 | ME2;5700 | AGE;2000 | R | — | methyl | 4980000 |
| A-11 | EG | EO;24000 | PO;5000 | AGE;1000 | R | — | methyl | 1460000 |

In Table 1, the group Z, the monomer component, the monomer unit configuration, and the terminal group are as follows:
Z:
EGMME: ethylene glycol monomethyl ether residue
EG: ethylene glycol residue
G: glycerin residue
TMP: trimetylolpropane residue
DG: diglycerin residue
PE: pentaerythritol residue
SO: sorbitol residue
Monomer Component:
EO: ethylene oxide
PO: propylene oxide
BO: butylene oxide
ME1: 2-(methoxyethoxy)glycidyl ether
ME2: 2-[2-(methoxyethoxy)ethyl]glycidyl ether
AGE: allyl glycidyl ether
(The numeral indicates the number of monomer units in one molecule.)
Monomer Unit Configuration:
H: homopolymer
R: random copolymer
B: block copolymer
Terminal Group:
A: acryloyl group
M: methacryloyl group Using the polymers No. A-1 to No. A-11 prepared above, along with polymerization initiators and solvents mentioned below, produced were solid electrolytes of the following Examples and Comparative Examples.

The polymerization initiators used herein are mentioned below. The data parenthesized indicate the temperature at which the half-value period of the compound is 10 hours.

a. Cumylperoxy neodecanoate (36.5° C.)
b. Di-n-propylperoxy dicarbonate (40.3° C.)
c. 1,1,3,3-Tetramethylbutylperoxy neodecanoate (40.7° C.)
d. Bis(4-t-butylcyclohexyl)peroxy dicarbonate (40.8° C.)
e. Diisopropylperoxy dicarbonate (40.5° C.)
f. Dimethoxybutylperoxy dicarbonate (45.8° C.)
g. Benzoyl peroxide (73.6° C.)
h. 1,1-Di(t-butylperoxy)-3,3,5-trimethylcyclohexane (95° C.)
i. T-amylperoxy 2-ethylhexanoate (70° C.)
j. Cumene hydroperoxide (157.9° C.)
The solvents used herein are as follows;

PC: Propylene carbonate
GBL: γ-butyrolactone
EC: Ethylene carbonate
DEC: Diethyl carbonate EXAMPLES 1 to 4

Gel-type Solid Electrolytes with Solvent

A solution of an electrolytic salt was prepared to have a concentration of 1 mol/liter, and added to 1 g of a polymer, to which was added an organic peroxide serving as a polymerization initiator. The resulting uniform solution was spread on a glass sheet, and heated thereon at 50° C. for 1 hour.

Table 2 shows the polymer used (for a mixture of polymers, the ratio by weight of the polymers is also shown), the electrolytic salt and the solvent used in preparing the electrolytic salt solution (for a mixture of solvents, the ratio by weight of the solvents is also shown), the amount of the solution added (g), the polymerization initiator used and its amount (in terms of % by weight relative to the total weight of the polymer and the electrolytic salt solution).

TABLE 2

| Example | Polymer | Electrolytic Salt | Solvent | Amount (g) | Polymerization Initiator | Amount (wt %) |
|---|---|---|---|---|---|---|
| 1 | A-1/A-6 = 2/8 | $LiClO_4$ | PC | 4 | a | 0.2 |
| 2 | A-2 | $LiBF_4$ | GBL | 3 | b | 2 |

TABLE 2-continued

| Example | Polymer | Electrolytic Salt | Solvent | Amount (g) | Polymerization Initiator | Amount (wt %) |
|---------|---------|-------------------|---------|------------|--------------------------|---------------|
| 3 | A-3 | LiTFSI | EC/GBL = 5/5 | 2 | c | 1.5 |
| 4 | A-4 | LiCF$_3$SO$_3$ | EC/DEC = 5/5 | 5 | d | 5 |

EXAMPLES 5 to 11

Dry-type Solid Electrolyte without Solvent

A solution of an electrolytic salt in methyl ethyl ketone was prepared to have a concentration of 50% by weight, and 0.2 g of this solution was added to 1 g of a polymer. An organic peroxide was added as a polymerization initiator thereto, and the resulting solution was spread on a glass sheet, and heated thereon at 50° C. for 1 hour. After the heat treatment, methyl ethyl ketone was removed under reduced pressure at 25° C.

Table 3 shows the polymer used, the electrolytic salt used, the polymerization initiator used and its amount (in terms of % by weight relative to the total weight of the polymer and the electrolytic salt).

TABLE 3

| Example | Polymer | Electrolytic Salt | Polymerization Initiator | Amount (wt %) |
|---------|---------|-------------------|--------------------------|---------------|
| 5 | A-5 | LiCF$_3$SO$_3$ | a | 4 |
| 6 | A-6 | LiBF$_4$ | c | 0.1 |
| 7 | A-2/A-7 = 2/8 | LiClO$_4$ | e | 0.05 |
| 8 | A-8 | LiPF$_6$ | f | 2 |
| 9 | A-9 | LiTFSI | b | 1.5 |
| 10 | A-10 | LiBF$_4$ | a | 3 |
| 11 | A-11 | LiTFSI | c | 2 |

Comparative Examples 1 to 3

In the same manner as in Examples 1 to 4, comparative solid electrolytes were prepared.

Table 4 shows the polymer used (for a mixture of polymers, the ratio by weight of the polymers is also shown), the electrolytic salt and the solvent used in preparing the electrolytic salt solution (for a mixture of solvents, the ratio by weight of the solvents is also shown), the amount of the solution on added (g), the polymerization initiator used and its amount (in terms of % by weight relative to the total weight of the polymer and the electrolytic salt solution).

TABLE 4

| Example | Polymer | Electrolytic Salt | Solvent | Amount (g) | Polymerization Initiator | Amount (wt %) |
|---------|---------|-------------------|---------|------------|--------------------------|---------------|
| 1 | A-1/A-2 = 2/8 | LiClO$_4$ | PC | 4 | g | 1 |
| 2 | A-2 | LiBF$_4$ | GBL | 3 | h | 2 |
| 3 | A-3 | LiTFSI | EC/GBL = 5/5 | 2 | c | 0.01 |

Comparative Examples 4 to 6

In the same manner the same manner as in Examples 5 to 11, comparative solid electrolytes were prepared.

Table 5 shows the polymer used, the electrolytic salt used, the polymerization initiator used and its amount (in terms of % by weight relative to the total weight of the polymer and the electrolytic salt).

TABLE 5

| Comparative Example | Polymer | Electrolytic Salt | Polymerization Initiator | Amount (wt %) |
|---------------------|---------|-------------------|--------------------------|---------------|
| 4 | A-6 | LiBF$_4$ | i | 1 |
| 5 | A-9 | LiTFSI | b | 0.02 |
| 6 | A-10 | LiBF$_4$ | j | 3 |

Evaluation of Curing Condition of Samples

The cured samples of Examples and Comparative Examples as above were visually checked for their condition. The results are in Table 6.

TABLE 6

| | Curing Condition |
|---|---|
| Example 1 | ○ |
| Example 2 | ○ |
| Example 3 | ○ |
| Example 4 | ○ |
| Example 5 | ○ |
| Example 6 | ○ |
| Example 7 | ○ |
| Example 8 | ○ |
| Example 9 | ○ |
| Example 10 | ○ |
| Example 11 | ○ |
| Comparative Example 1 | X |
| Comparative Example 2 | X |
| Comparative Example 3 | X |
| Comparative Example 4 | X |
| Comparative Example 5 | X |
| Comparative Example 6 | X |

○: The solution well cured to give a self-sustaining film.
X: The solution was still liquid, or even if gelled, it still did not give a self-sustaining film.

What is claimed is:

1. A method for producing a solid electrolyte, which comprises:

preparing a precursor comprising an alkylene oxide polymer having a polymerizable double bond at a terminal and/or in a side chain, an electrolytic salt, and a solvent;

adding an organic peroxide initiator having an activation energy of not greater than 35 Kcal/mol and having a half-value period of 10 hours at a temperature not higher than 50° C. to the precursor in an amount of from 0.05 to 5% by weight relative to the total weight of the alkylene oxide polymer, the electrolytic salt and the solvent; and thermally crosslinking the alkylene oxide polymer in the precursor.

2. A method for producing a solid electrolyte, which comprises:

preparing a precursor comprising an alkylene oxide polymer having a polymerizable double bond at a terminal and/or in a side chain and an electrolytic salt;

adding an organic peroxide initiator having an activation energy of not greater than 35 Kcal/mol and having a half-value period of 10 hours at a temperature not higher than 50° C. to the precursor in an amount of from 0.05 to 5% by weight relative to the total weight of the alkylene oxide polymer and the electrolytic salt; and thermally crosslinking the alkylene oxide polymer in the precursor.

3. The method for producing a solid electrolyte as set forth in claim 2 wherein said organic peroxide initiator is selected from the group consisting of isobutyryl peroxide, a,a'-bis (neodecanoylperoxy)diisopropylbenzene, cumylperoxy neodecanoate, di-n-propylperoxy dicarbonate, 1,1,3,3-tetramethylbutylperoxy neodecanoate, bis(4-t-butylcyclohexyl)peroxy dicarbonate, 1-cyclohexyl-1-methylethylperoxy neodecanoate, di-2-ethoxyethylperoxy dicarbonate, di(2-ethylhexylperoxy) dicarbonate, t-hexylperoxy neodecanoate, dimethoxybutylperoxy dicarbonate, di(3-methyl-3-methoxybutylperoxy) dicarbonate and t-butylperoxy neodecanoate.

4. The method of claim 2, wherein the precursor consists of an alkylene oxide polymer having a polymerizable double bond at a terminal and/or in a side chain and an electrolytic salt.

* * * * *